(12) United States Patent
Agrawal et al.

(10) Patent No.: US 9,965,260 B2
(45) Date of Patent: May 8, 2018

(54) SOFTWARE PRODUCT RELEASE AUTOMATION FRAMEWORK

(71) Applicant: ORACLE INTERNATIONAL CORPORATION, Redwood Shores, CA (US)

(72) Inventors: Garima Agrawal, Hyderabad (IN); Hrishikesh Das, Hyderabad (IN); Muthuveerappan Periyakaruppan, Hyderabad (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 164 days.

(21) Appl. No.: 14/624,878

(22) Filed: Feb. 18, 2015

(65) Prior Publication Data

US 2016/0239283 A1 Aug. 18, 2016

(51) Int. Cl.
G06F 9/445 (2006.01)
G06F 9/44 (2018.01)

(52) U.S. Cl.
CPC ............ *G06F 8/60* (2013.01); *G06F 8/36* (2013.01); *G06F 8/61* (2013.01); *G06F 8/71* (2013.01)

(58) Field of Classification Search
CPC ... G06F 8/36; G06F 8/447; G06F 8/47; G06F 8/60–8/61; G06F 8/63–8/64; G06F 8/76
See application file for complete search history.

(56) References Cited

U.S. PATENT DOCUMENTS 6,195,795 B1 2/2001 Block et al.
6,785,882 B1 * 8/2004 Goiffon ............... G06F 8/36
 707/999.2

(Continued)

FOREIGN PATENT DOCUMENTS

CN 103412768 11/2013

OTHER PUBLICATIONS

Mietzner et al. "Variability modeling to support customization and deployment of multi-tenant-aware software as a service applications." Proceedings of the 2009 ICSE Workshop on Principles of Engineering Service Oriented Systems. IEEE Computer Society, 2009.*

(Continued)

*Primary Examiner* — Li B Zhen
*Assistant Examiner* — Joanne Macasiano
(74) *Attorney, Agent, or Firm* — Cooper Legal Group, LLC

(57) ABSTRACT

Systems, methods, and other embodiments associated with a software product release automation framework are described. In one embodiment, a system includes a repository configured to store activity instances and process instances. Each activity instance includes parameters and a plurality of blocks of executable code for performing the activity. Each block of executable code is associated with a target platform. Each process instance includes activity instances and a sequence in which the activity instances are to be performed. The system includes interpreter logic configured to retrieve a requested process instance and read the process instance to identify activity instances and parameter values for the parameters in the activity instances. The interpreter logic reads the activity instances to identify the block of code for the platform and combines the parameter (Continued)

values and the block of code to create a target definition for an execution application on the target's platform.

17 Claims, 7 Drawing Sheets

(56) References Cited

U.S. PATENT DOCUMENTS

| | | | |
|---|---|---|---|
| 7,069,553 B2 | 6/2006 | Narayanaswamy et al. | |
| 7,950,010 B2 | 5/2011 | Goger et al. | |
| 8,166,469 B2 | 4/2012 | Milner | |
| 9,201,637 B1* | 12/2015 | Kvinge | G06F 8/47 |
| 2003/0182652 A1 | 9/2003 | Custodio | |
| 2004/0060035 A1 | 3/2004 | Ustaris | |
| 2005/0198628 A1* | 9/2005 | Graham | G06F 8/64 717/174 |
| 2006/0165123 A1* | 7/2006 | Jerrard-Dunne | G06F 8/36 370/468 |
| 2008/0250385 A1 | 10/2008 | Sanchez | |
| 2014/0047424 A1* | 2/2014 | Fontenot | G06F 8/47 717/162 |

OTHER PUBLICATIONS

Creech et al., "Using hypertext in selecting reusable software components." Proceedings of the third annual ACM conference on Hypertext. ACM, 1991.*

CA Technologies; CA LISA Release Automation, 2014; downloaded from: http://www.ca.com/se/en/devcenter/ca-lisa-release-automation.aspx; pp. 1-3.

Xebia; Deployit, 2013; downloaded from: http://gallery.xebia.com/component/deployit; pp. 1-2.

Xebia; Deployment Automation; downloaded on May 21, 2014 from: http://www.xebialabs.com/solutions/deployment-automation; pp. 1-4.

Xebia; Deployit Value / cachet-software; downloaded on May 21, 2014 from: http://www.cachet-software.com/xl-platform/xebialabs-resources/deployit-value-2/; pp. 1.

BMC; Application Deployment & Release Automation; downloaded on May 20, 2014 from: http://www.bmc.com/it-solutions/product-listing/bladelogic-application-release-automation.html; pp. 1-2.

Buildbot; downloaded on May 22, 2014 from: http://buildbot.net/#/automation; pp. 1-5.

Octopus Deploy; Automated Deployment for .NET; downloaded May 22, 2014 from: http://octopusdeploy.com; pp. 1-3.

IEEE Xplore; Cross Platform Automated Software Builds, Tests and Deployment; downloaded on May 21, 2014 from: http://ieeexplore.ieee.org/xpl/articleDetails.jsp?tp=&arnumber=5298470&queryText%3DVirtualization+Techniques+for+Cross+Platform+Automated+Software+Builds%2C+Tests+and+Deployment; pp. 1.

IBM; Build and release process automation solutions for software development; downloaded from: http://public.dhe.ibm.com/software/rational/web/reports/Build_and_Release_Process_Automation_Solutions_for_Development.pdf; pp. 1-28.

* cited by examiner

```
<<<ExtractCodeFromSource.xml>>>
<?xml version='1.0' encoding='UTF-8'?>
<ACTIVITY>
   <NAME>ExtractCodeFromSource</NAME>
   <DESC> extract code from perforce </DESC>
   <PARAMETERS>
       <PARAM><NAME>PRODUCT</NAME><VALUE/><PARAM>
       <PARAM><NAME>VERSION</NAME><VALUE /><PARAM>
       <PARAM><NAME>P4_CODELINE</NAME><VALUE /><PARAM>
       <PARAM><NAME>FW_VERSION</NAME><VALUE /><PARAM>
       <PARAM><NAME>TIMESTAMP</NAME><VALUE /><PARAM>
   </PARAMETERS>

<CODE>
       <SHELL>
   cd/spl/intbasee/${FW_VERSION}/bin
   ./extractP4.sh –p${PRODUCT} –s ${P4_CODELINE} –v ${VERSION} –${TIMESTAMP}
       </SHELL>
       <BATCH>
   cd/spl/intbasee/%FW_VERSION%/bin
   ./extractP4.cmd –p %PRODUCT% –s %P4_CODELINE% –v %VERSION% –%TIMESTAMP%
       </BATCH>
   </CODE>
</ACTIVITY>
```

Parameter Section 210

Code Section 220

Figure 2B

SOFTWARE PRODUCT RELEASE AUTOMATION FRAMEWORK

BACKGROUND

Software product release processes are typically complex, labor intensive, and error prone. Software product release processes usually consist of scripts and binaries that need to be executed remotely across multiple servers and operating systems. In a software development organization, software product release processes are executed repeatedly, several times in a week in many cases.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIGS. 2A and 2B illustrate the XML structure of one embodiment of an activity.

DETAILED DESCRIPTION

Figure 1:
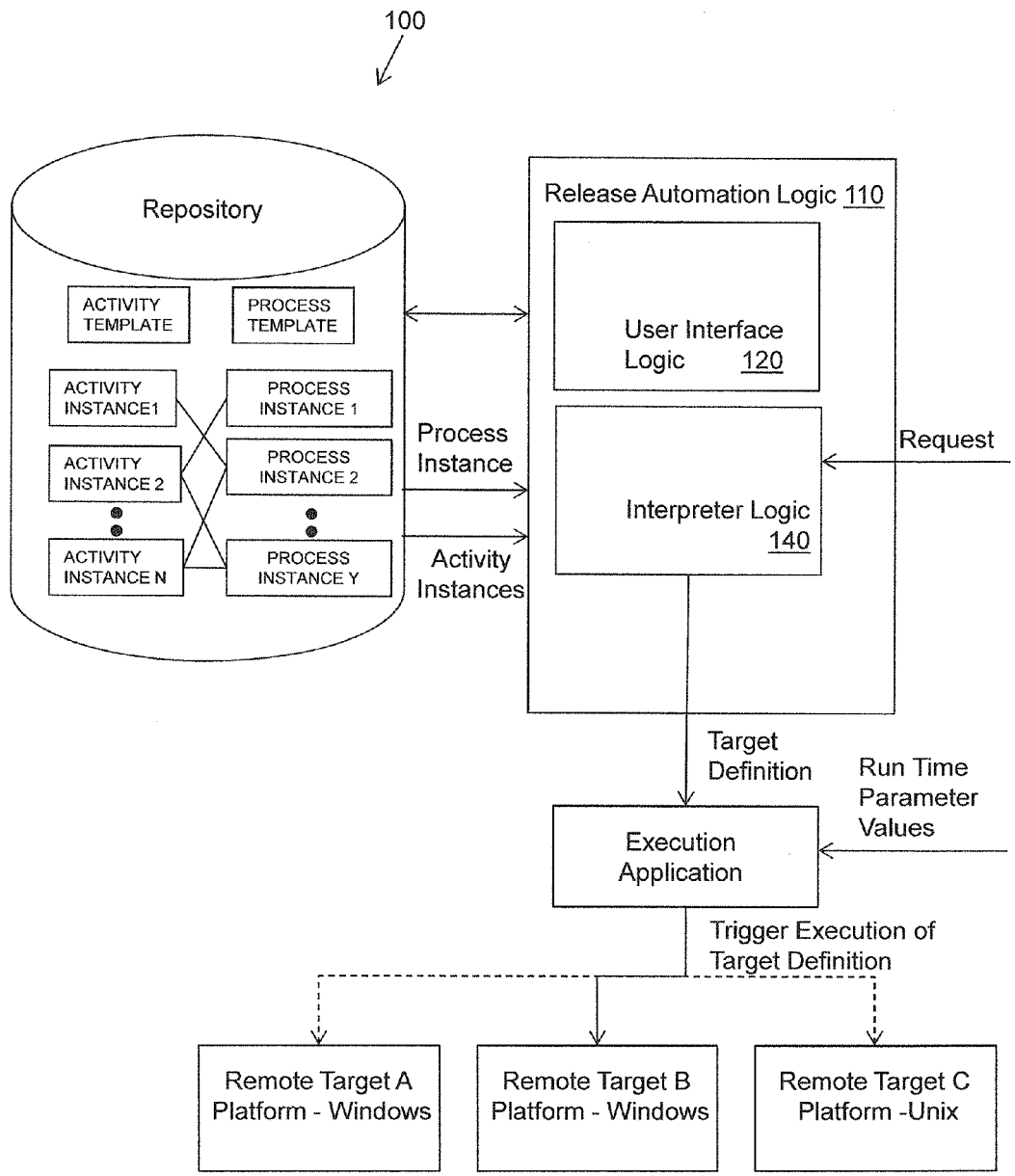
FIG. 1 illustrates one embodiment of a system associated with a software product release automation framework.

The complexity of maintaining and executing software product release processes increases manifold as product architectures become more complex and parallel releases of software products become more common. Time sharing of release engineers is difficult because the technology used in the release process differs across products. Release efforts are wasted between process steps and communication between different teams of people.

For the purposes of this description, a software product release process is any one of a large gamut of processes for managing software releases from the early development stage to the software product's release to market. Examples of release processes include building a product from source artifacts, packaging and delivery of the product to end users, creation of installers, deployment mechanisms, maintenance and patching processes, product upgrades, and so on. The "customer" to which a software product is released may be an end user customer who purchased the software product and needs to install the software on his hardware or a software developer needing the most recent version of a software product that she is developing in collaboration with other developers.

The software product release process is performed on the customer machines using an "execution application" that is adapted to perform the various release related functions on remote targets in the customer's environment. Example execution applications include Hudson, which can be run on remote targets utilizing either a Windows or Unix platform operating system. A software product release process includes one or more tasks that are performed in the customer's environment. Example tasks include extraction, compilation, packaging, installation, and patching. Extraction synchronizes development code from a source repository to a build server. Compilation converts the source code into binary code and resolves dependencies. Packaging assembles compiled code into archives and packages that can be delivered to a customer. Patching applies a code fix to an already installed software product in the customer's environment.

Depending on the specific software product release process being performed, one or more tasks will be included in the process. For example, a build process may include an extraction task, a compilation task, and a packaging task. A deployment process may include an installation task that loads pre-requisite software required before installation of the software product, an installation task that loads the software product's components, a configuration task (e.g., providing user values for parameters), and environment stop/start and monitoring task.

Existing solutions that attempt to automate software product release are based on creating scripts or jobs that perform a certain task or tasks with a specific execution application. These scripts or jobs are specific to the task and execution application and are not re-usable.

Systems and methods are described herein that provide a software product release automation framework. The software product release automation framework separates the definition of a software product release process from the execution of the software product release process. This is accomplished by providing templates for defining "activities" and "processes." Each activity corresponds to a task that may be included in a software product release process. As defined in the framework, activities are atomic, execution application agnostic, and reusable. Templates are also provided for defining a software product release process as a collection of selected activities.

Once a software product release process has been defined, the software product release process can be interpreted for a given target execution application to create a target definition (e.g., a Hudson definition file) suitable for use with the remote target's platform. A target definition is file that specifies various functions and parameters in release process in a manner that is understandable by a particular execution application. The target definition is provided to a remote execution application for execution on remote targets in the customer's environment. Note that for the purposes of this description, the terms "operating system" and "platform" will be used interchangeably and are intended to have the same definition.

FIG. 1 illustrates an example embodiment of a system 100 that provides a software product release automation framework. The system 100 includes release automation logic 110 configured to provide an automation framework for software product release processes. The release automation logic 110 interacts with a repository (e.g., computer storage medium) that stores an activity template and a process template as well as a plurality of activity instances and process instances. Each activity instance corresponds to a software product release-related task as described above (e.g., compilation, extraction, and so on). Each process instance corresponds to a set of activity instances arranged in a specific order in which the activity instances should be performed.

The release automation framework logic 110 is configured to input a request to run a software product release process on a given target execution application. The request may be received from a software developer by way of the execution application. The request includes a process instance identifier and an intended platform. The remote targets may have different platforms. Thus the request specifies the platform in use by the remote target on which the process instance will be run. For example, the request might specify a "build" process instance and a "Windows" platform.

The release automation framework logic 110 retrieves a process instance corresponding to the process from the repository and creates a target definition that can be used by an execution application to perform the requested process on a remote target (e.g., one of the remote targets A-C). For the purposes of this description, a remote target is a computer or computing device that is operating in a slave type relationship to a computer or computing device on which the execution application is executing.

Figure 2A:
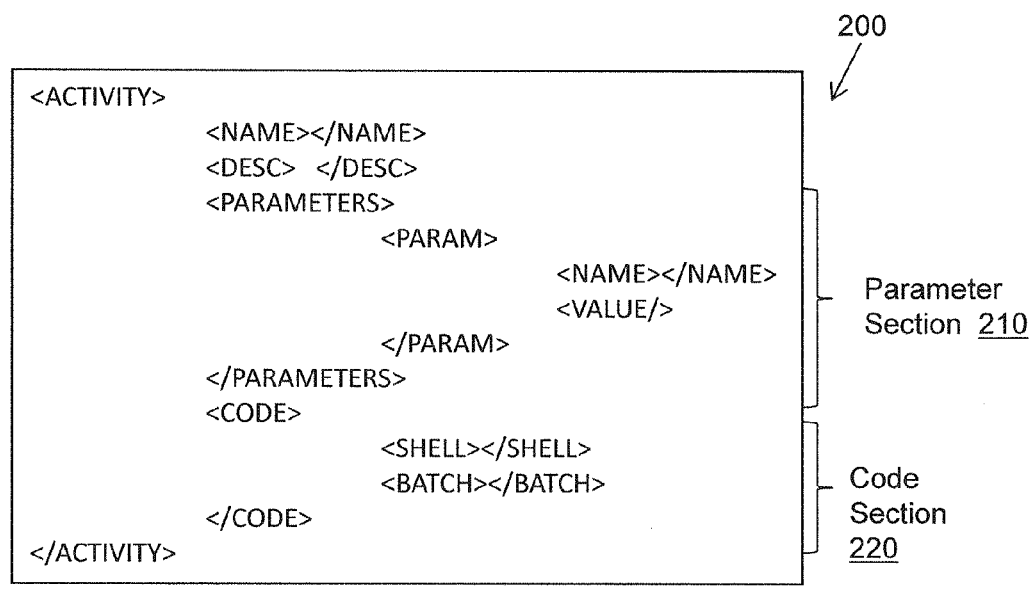
Figure 3A:
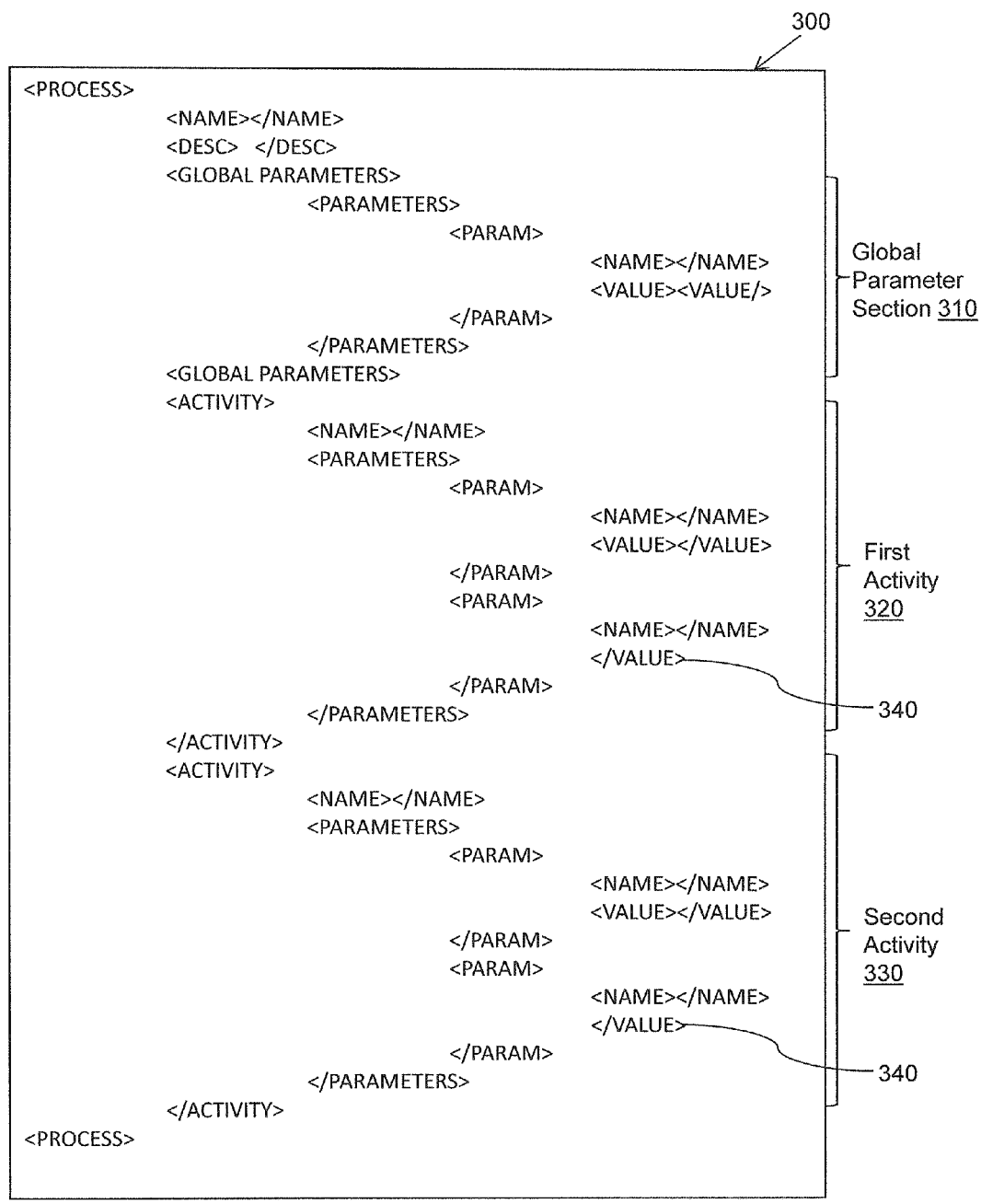
FIGS. 3A and 3B illustrate the XML structure of one embodiment of a process.
Figure 3B:
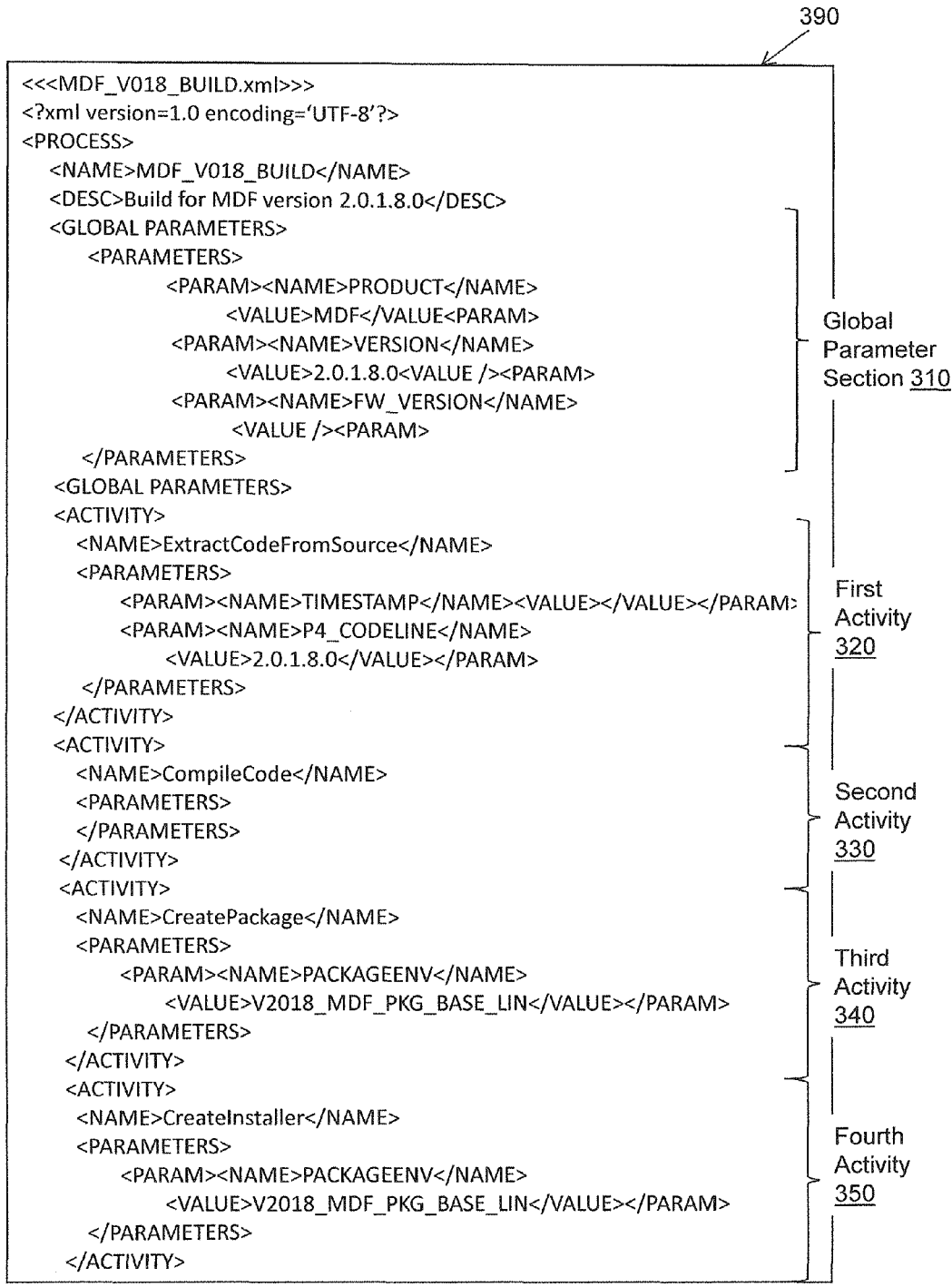

The repository stores an activity template and a process template. The release automation logic 110 includes a user interface logic 120 configured to provide an interface through which a user can instantiate the activity template to create an activity instance. An example showing an XML structure of an activity is shown in FIGS. 2A and 2B. The user interface logic 120 interface also provides an interface through a user can instantiate the process template to create a process instance. An example showing an XML structure of a process is shown in FIGS. 3A and 3B. In one embodiment, the activity template and process template are Extensible Mark-up Language (XML) documents, the activity instances are instantiations of the XML activity template, and the process instances are instantiations of the XML process template.

FIG. 2A illustrates the XML structure of an activity template 200. An activity instance 290, shown in FIG. 2B, is generated by filling in data values between tags in the activity template and is an atomic level, generic task that is performed as part of a software product release process. The activity instance is a reusable component that can be part of one or more processes. Recall that in FIG. 1, each process instance in the repository includes one or more activity instances.

The activity 200 includes tags for identifying a name and description of the activity instance. The activity 200 also includes a parameter section 210 and a code section 220. The parameter section 210 allows a user to define one or more parameters that are required by the activity. A parameter is a variable used in an activity whose value can change each time the activity is executed (e.g., a timestamp). The parameter section can be used multiple times if multiple parameters are involved with the activity instance. Parameter values are not defined in the activity instance. Instead, the parameter values are defined when the activity instance is included in a process instance.

The code section 220 allows a user to store blocks of executable code for one or more platforms (e.g., operating systems) that may be used by an execution applications to perform the process on a remote target. For example, in the activity 200, the SHELL tag is used to specify UNIX code and the BATCH tag is used to specify Windows code. Depending on which platform is in use by the remote target, one of the blocks of code will be selected when the target definition is created.

FIG. 3A illustrates the XML structure of a software product release process template 300. A process instance 390, shown in FIG. 3B, is generated by filling in data values between tags in the process template and is a reusable component that can be used to perform the same software product release process at different times and on different execution applications. Recall that a software product release process is a group of activities that are performed in a specified order. The order in which the activities should be performed is established by specifying them in the proper order in the process instance.

When a user creates a process instance, the user selects the activity instances that are to be included in the process instance. The process instance includes the parameters for each activity instance in the process instance. For example the process 300 includes a first activity 320 and a second activity 330. When the process instance is created, the user is prompted to fill in values for the parameters in each activity based on the process instance being created. In addition, the user may define global parameters in a global parameter section 310 for parameters having values that are common to all the activities in the process 300. Some parameters may be designated as run time parameters by leaving the value blank as designated by the blank values 340 in the process 300. Values for the runtime parameters will be collected when the target definition is deployed to the execution application.

Thus, a user wishing to create a process instance does not need create the activities himself, but rather can simply select the activity instances to be included in the process instance. By including an activity instance in the process instance, the proper parameters for the activity instance are then included in the process instance. Note that any activity instance can be used by any number of process instances and the process instances can be performed at the same time as parallel jobs.

Returning to FIG. 1, the user supplies values for the parameters for the various activities and the target definition is created based on the remote target's execution application, at request time, automatically by an interpreter logic 140. Note that the same process instance can be used for all execution engines because the executable code for the target's platform is not selected from amongst the blocks of executable code in the activity instances until the target definition is created for a particular remote target.

In one embodiment, the release automation logic 110 includes interpreter logic 140 configured to create the target definition by reading the process instance which includes a plurality of activity instance(s). For example, process instance 2 in the repository includes activity instance 1 and activity instance N. Each activity instance defines one or more parameters. Each activity instance also includes blocks of executable code, that when executed by an execution application on a remote target causes the remote target to perform functions corresponding to the activity. The activity instances may have several different blocks of executable code (e.g., Windows, UNIX, and so on) for different operating systems for different remote targets. The interpreter logic 140 is configured to select the appropriate block of executable code based on the platform of the target that will be running the software product release process.

Each process instance includes parameter values for the parameters in the activity instances referenced in the process instance. A process instance may also define global parameters that apply to all activity instances in the process instance.

The interpreter logic 140 is configured to combine the parameter values in the process instance and the appropriate block of executable code for each activity instance referenced in the process instance to create a target definition.

The release automation logic 110 provides the target definition for deployment to the target execution application. Once the target definition is deployed on the target execution application, runtime parameters can be defined and the user can use the target execution application's features to schedule and execute the software product release process on the remote target.

In one embodiment, the interpreter logic 140 is a Java program that reads the process instances and activity definitions and automatically converts the process instances and activity instances into a target definition understandable by the execution application. The interpreter logic 140 also creates process custom views in a structured way to allow a user to see all process instances that are being deployed on the execution application. The interpreter logic 140 reads a process instance, identifies the activity instances in the process instance, converts any global variables, and run time parameters defined in the process instance into an equivalent target definition.

In one embodiment, the interpreter logic 140 converts process instances into jobs that can be run by the execution application running on its platform. For example, the interpreter logic 140 may convert process instances into Hudson jobs and deploy the Hudson jobs onto Hudson in structured process views. The interpreter logic 140 also automatically adds a start hook to the process instance. The start hook is used by the end user to trigger the process automatically. In addition, the start hook is also used for instrumentation needs (e.g., how much time the process took, logging needs, and so on). Looking at the process view in Hudson, a user can know all the jobs that will execute and their order of execution. All the runtime parameters of a process are prompted when the end user invokes the Hudson job.

In one embodiment, the interpreter logic 140 is capable of processing custom activities and processes. A custom activity instance or custom process instance is an instance that has been modified and saved in a predetermined folder. The interpreter logic 140 is configured to look for activity instances and process instances in the predetermined folder before looking in the main repository. In this manner, a user can employ a modified activity instance or process instance without modifying the base instances used by others.

Figure 4:
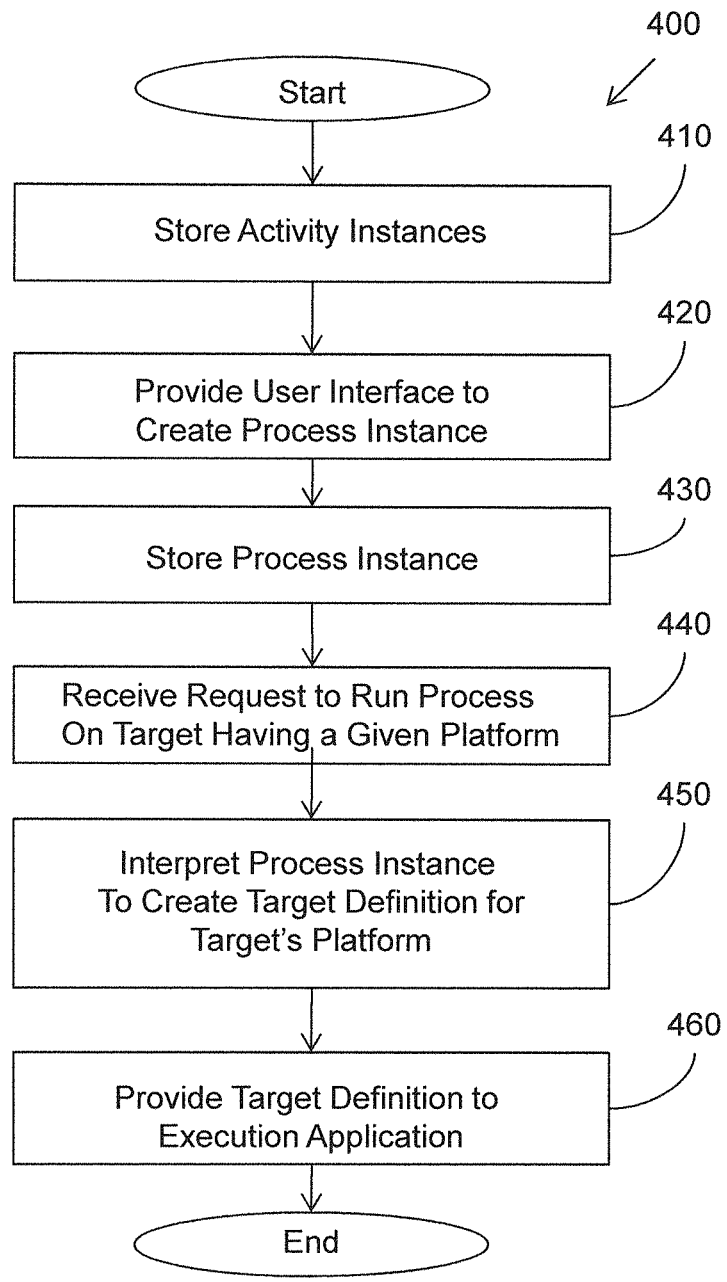
FIG. 4 illustrates an embodiment of a method associated with a software product release automation framework.

FIG. 4 illustrates one embodiment of a method 400 of providing a software release automation framework. The method 400 may be performed by the interpreter logic 140 of FIG. 1 and/or other logics also described with respect to FIG. 1. The method includes, at 410, storing a plurality of activity instances in a repository. Each activity instance includes one or more parameters and two or more blocks of executable code. Each block of executable code is associated with a different target platform, such that when a given block of executable code is executed by a given target using the platform associated with the given block of executable code, the given block of executable code causes the given target to perform functions corresponding to the activity.

At 420, the method includes providing a user interface through which a user can create a process instance by selecting one or more activity instances to include in the process instance. At 430, the method includes storing the process instance in the repository. At 440, the method includes receiving a request to run the process instance on a target having a given platform. At 450, the method includes interpreting the process instance to create a target definition that, when executed by an execution application on the target, will cause the target to perform the functions corresponding to the selected activity instances. At 460, the method includes providing the target definition to the execution application.

In one embodiment, the method 400 includes determining the platform of the target and retrieving a process instance corresponding to the process from the repository. The process instance is interpreted by identifying i) the activity instances included in the process instance, ii) parameter values for the one or more parameters included in the activity instances; and iii) respective blocks of executable code associated with the platform of the remote target. The identified parameter values and the blocks of executable code in the activities are combined to create the target definition.

In one embodiment, the method 400 includes identifying a run time parameter in the process instance and when the target definition is deployed on the execution application, receiving a value for the run time parameter.

Systems and methods are described herein that provide a software product release automation framework. The described framework automates software product release processes. The described framework makes the software product release processes less error prone by providing a user friendly and uniform mechanism of administering software product release processes. The described framework hides the complexity of the software product release process from the release engineer.

The software product release automation framework described herein automates user interactive processes. The framework includes a mechanism for providing user inputs required by an activity instance during the execution of the activity instance (e.g., prompting a user to confirm they want to install). Because the activity and processes are defined in a generic XML way, they activity instances and process instances can be used by all execution application engines. The hooks added by the interpretation process can be used for logging and instrumentation purposes.

In one embodiment, the software product release automation framework described herein is based on open technologies like Java and XML, simplifying development and maintenance. The end user will not need extensive training in the particulars of the software product release activities, processes, or execution engines because the framework automatically combines stored activity instances and process instances to create a target definition. The same activity instance can be used multiple times in multiple process instances. The framework makes it possible to carry out multiple builds and deployments concurrently.

The software product release automation framework described herein allows for easy propagation of process changes within an organization. Changes to the executable code for activities will be propagated to the process instances when the process instance is invoked to create a target definition. This ensures that the executable code for a process instance is up to date and is propagated to all processes that are using the modified activity.

The software product release automation framework described herein provides an automated way to execute complex software release processes by abstracting out the definition of a release process from its execution. The automation framework makes the software release process more scalable, reliable, repeatable, and error free.

Computing Device Embodiment

Figure 5:
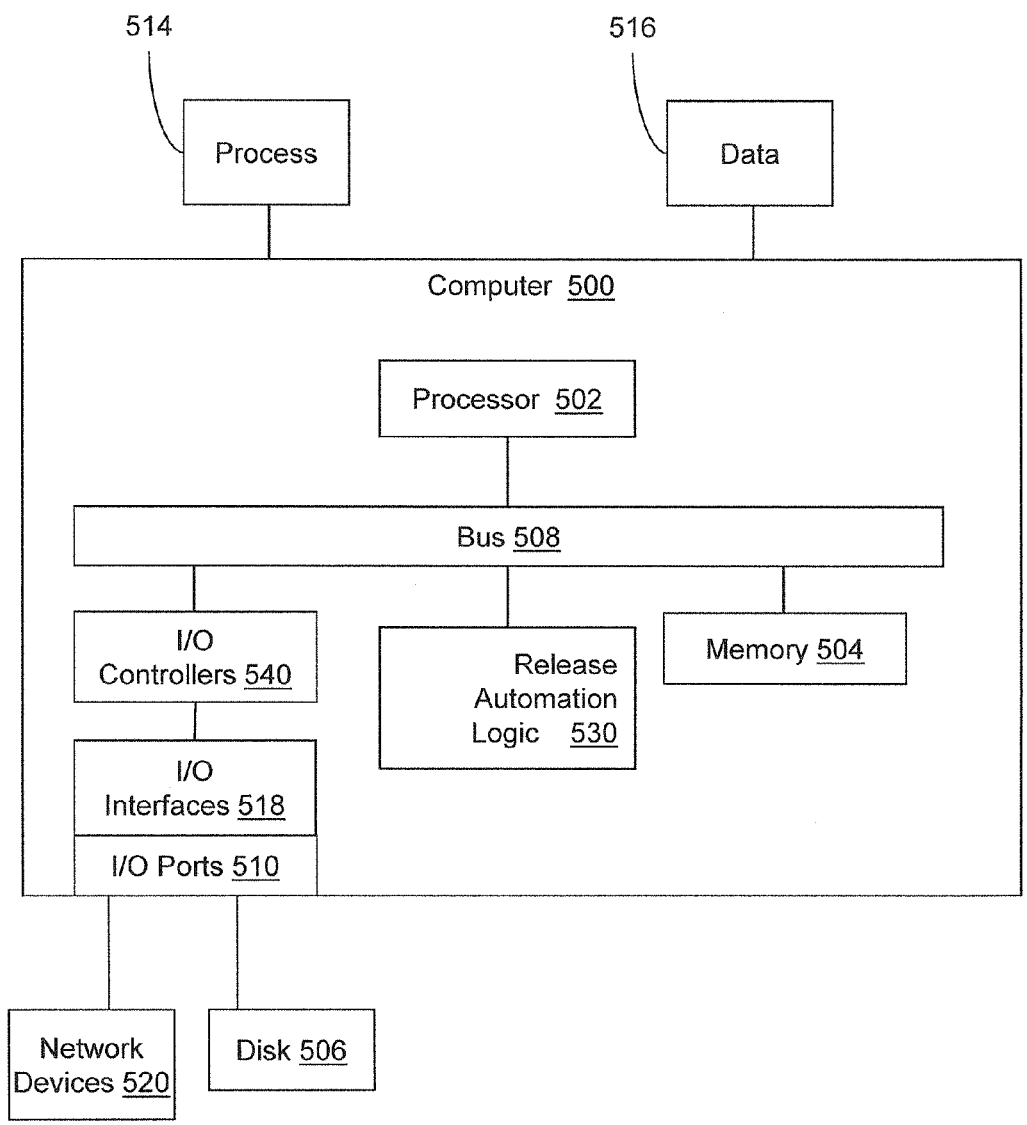
FIG. 5 illustrates an embodiment of a computing system configured with the example systems and/or methods disclosed.

FIG. 5 illustrates an example computing device that is configured and/or programmed with one or more of the example systems and methods described herein, and/or equivalents. The example computing device may be a computer 500 that includes a processor 502, a memory 504, and input/output ports 510 operably connected by a bus 508. In one example, the computer 500 includes release automation logic 530 configured to provide an automation framework for software product release processes.

The release automation logic 530 is similar to the release automation logic 110 described with respect to FIGS. 1-4 and in some embodiments performs the method 400 of FIG. 4. In different examples, the release automation logic 530 may be implemented in hardware, a non-transitory computer-readable medium with stored instructions, firmware, and/or combinations thereof. While the release automation logic 530 is illustrated as a hardware component attached to the bus 508, it is to be appreciated that in one example, the release automation logic 530 could be implemented in the processor 502.

In one embodiment, release automation logic 530, or the computer is a means (e.g., hardware, non-transitory computer-readable medium, firmware) for performing the functions for automatically creating a target definition for a software product release process for a target execution application as described with respect to FIGS. 1-4.

In one embodiment, release automation logic 530 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on).

The means may be implemented, for example, as an application specific integrated circuit (ASIC) programmed to perform the functions described with respect to FIGS. 1-4. The means may also be implemented as stored computer executable instructions that are presented to computer 500 as data 516 that are temporarily stored in memory 504 and then executed by processor 502.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, read-only memory (ROM), programmable ROM (PROM), and so on. Volatile memory may include, for example, random access memory (RAM), static RAM (SRAM), dynamic RAM (DRAM), and so on.

A storage disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a compact disc—ROM (CD-ROM) drive, a CD recordable (CD-R) drive, a CD rewritable (CD-RW) drive, a digital video disk (DVD) ROM, and so on. The memory 504 can store a process 514 and/or a data 516, for example. The disk 506 and/or the memory 504 can store an operating system that controls and allocates resources of the computer 500.

The computer 500 may interact with input/output devices via the I/O interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and universal serial bus (USB) ports.

The computer 500 can operate in a network environment and thus may be connected to the network devices 520 via the input/output (I/O) interfaces 518, and/or the I/O ports 510. Through the network devices 520, the computer 500 may interact with a network. Through the network, the computer 500 may be logically connected to remote computers. Networks with which the computer 500 may interact include, but are not limited to, a local area network (LAN), a wide area network (WAN), and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a "Software as a Service" (SaaS) architecture, a smart phone, and so on. In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C §101.

"Logic", as used herein, represents a component that is implemented with computer or electrical hardware, firmware, a non-transitory medium with stored instructions of an executable application or program module, and/or combinations of these to perform any of the functions or actions as disclosed herein, and/or to cause a function or action from another logic, method, and/or system to be performed as disclosed herein. Logic may include a microprocessor programmed with an algorithm, a discrete logic (e.g., ASIC), at least one circuit, an analog circuit, a digital circuit, a programmed logic device, a memory device containing instructions of an algorithm, and so on, any of which are configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. Logic is limited to statutory subject matter under 35 U.S.C. §101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer storage medium storing computer-executable instructions that when executed by a computer with at least one processor cause the computer to:
   store a plurality of activity instances in a repository where each activity instance includes:
      one or more parameters for an activity, wherein each parameter is a variable that is changeable when the activity is executed; and
      two or more blocks of executable code for performing the activity, where each block of executable code is configured for a different target platform to be executable by a corresponding operating system of the target platform;
   provide a user interface on a display through which a user can create a process instance by selecting one or more activity instances and specify a sequence in which the activity instances are to be performed, wherein the process instance comprises a deployment process comprising an installation activity instance to load prerequisite software required before installation of a software product, a second installation activity instance that loads components of the software product, and a configuration activity instance to provide values for the one or more parameters;
   store the process instance in the repository;
   in response to a request to run the process instance on a first target having a first platform, interpret the process instance by:
      identifying the activity instances included in the process instance;
      identifying parameter values for the one or more parameters included in the activity instances;
      from the identified activity instances, identifying and selecting at least one block of code from the two or more blocks of executable code, wherein the selected at least one block of code is configured for the first target and is executable by a corresponding operating system of the first target; and
      combining at least the process instance, the identified parameter values and the selected at least one block of executable code from the activity instances to create the target definition in a data structure, wherein any changes that have been made to the executable code for activities will be propagated to the process instance when the process instance is invoked to create the target definition; and
      providing the target definition to an execution application at the first target to cause the first target to execute the process instance and the at least one block of executable code.

2. The non-transitory computer storage medium of claim 1, further comprising instructions that when executed by the computer with the at least one processor cause the computer to:
    store a process template that enables a user to create the process instance by instantiating the process template; and
    store an activity template that enables a user to create an activity instance by instantiating the activity template.

3. The non-transitory computer storage medium of claim 1, where the process instance and the activity instances are XML document instantiations of a process template and an activity template, respectively.

4. The non-transitory computer storage medium of claim 1, further comprising instructions that when executed by the computer with the at least one processor cause the computer to:
    identify a run time parameter in the process instance; and
    when the target definition is deployed on the execution application, receive a value for the run time parameter.

5. The non-transitory computer storage medium of claim 1, further comprising instructions that when executed by the computer with the at least one processor cause the computer to:
    receive a request to run the process on a different target having a different platform;
    retrieve the process instance;
    read the plurality of activity instances included in the process instance to identify respective different blocks of executable code associated with the different platform;
    combine the parameter values in the process instance and the identified blocks of different executable code in the activities to create a different target definition; and
    provide the different target definition to the execution application for execution on the different target.

6. The non-transitory computer storage medium of claim 1, where the executable code comprises code interpretable by a Unix platform or a Windows platform.

7. A computing system, comprising:
    a repository having stored therein (i) a plurality of activity instances that define tasks for performing a software product release, and (ii) process instances wherein each process instance defines a set of activity instances and an order for performing the activity instances;
    where each activity instance includes:
        one or more parameters for an activity, wherein each parameter is a variable that is changeable when the activity is executed; and
        two or more blocks of executable code for performing the activity, where each block of executable code is configured for a different target platform to be executable by a corresponding operating system of the target platform;
    a user interface through which a user can create a process instance by selecting one or more activity instances and specify a sequence in which the activity instances are to be performed, wherein the process instance comprises a deployment process comprising an installation activity instance to load pre-requisite software required before installation of a software product, a second installation activity instance that loads components of the software product, and a configuration activity instance to provide values for the one or more parameters;
    a processor; and a non-transitory computer readable medium including instructions that when executed by the processor cause the processor to, in response to a request to run the process instance on a first target having a first platform:
        identifying the activity instances included in the process instance;
        identifying parameter values for the one or more parameters included in the activity instances;
        from the identified activity instances, identifying and selecting at least one block of code from the two or more blocks of executable code, wherein the selected at least one block of code is code that is configured for the first target and is executable by a corresponding operating system of the first target; and
        combining at least the process instance, the identified parameter values and the selected at least one block of executable code from the activity instances to create the target definition in a data structure, wherein any changes that have been made to the executable code for activities will be propagated to the process instance when the process instance is invoked to create the target definition; and
        providing the target definition to an execution application at the first target to cause the first target to execute the process instance and the at least one block of executable code.

8. The computing system of claim 7, where the process instance and the activity instances are XML document instantiations of a process template and an activity template, respectively.

9. The computing system of claim 7, where the repository stores:
    a process template that is accessible by a user through the user interface to create the process instance by instantiating the process template; and
    an activity template that is accessible by a user through the user interface to create an activity instance by instantiating the activity template.

10. The computing system of claim 7, where the instructions further cause the processor to:
    identify a run time parameter in the process instance; and
    when the target definition is deployed on the execution application, receive a value for the run time parameter.

11. The computing system of claim 7, where the instructions further cause the processor to:
    receive a request to run the process on a different target having a different platform;
    retrieve the process instance;
    read the plurality of activity instances included in the process instance to identify respective different blocks of executable code associated with the different platform;
    combine the parameter values in the process instance and the identified blocks of different executable code in the activities to create a different target definition; and
    provide the different target definition to the execution application for execution on the different target.

12. A computer-implemented method, comprising:
    storing a plurality of activity instances in a repository, wherein each activity instance defines tasks for performing a software product release, and wherein each of the activity instances includes:
        one or more parameters for an activity, wherein each parameter is a variable that is changeable when the activity is executed; and
        two or more blocks of executable code for performing the activity, where each block of executable code is configured for a different target platform to be executable by a corresponding operating system of the target platform;

providing a user interface on a display screen through which a user can create a process instance by selecting one or more activity instances and specify a sequence in which the activity instances are to be performed, wherein the process instance comprises a deployment process comprising an installation activity instance to load pre-requisite software required before installation of a software product, a second installation activity instance that loads components of the software product, and a configuration activity instance to provide values for the one or more parameters;

storing the process instance in the repository;

in response to a request to run the process instance on a first target having a first platform, interpret the process instance by:

identifying the activity instances included in the process instance;

identifying parameter values for the one or more parameters included in the activity instances;

from the identified activity instances, identifying and selecting at least one block of code from the two or more blocks of executable code, wherein the selected at least one block of code is configured for the first target and is executable by a corresponding operating system of the first target; and combining at least the process instance, the identified parameter values and the selected at least one block of executable code from the activity instances to create the target definition in a data structure, wherein any changes that have been made to the executable code for activities will be propagated to the process instance when the process instance is invoked to create the target definition; and providing the target definition to an execution application at the first target to cause the first target to execute the process instance and the at least one block of executable code.

13. The computer-implemented method of claim 12, further comprising:

storing a process template that enables a user to create the process instance by instantiating the process template; and storing an activity template that enables a user to create an activity instance by instantiating the activity template.

14. The computer-implemented method of claim 12, where the process instance and the activity instances are XML document instantiations of a process template and an activity template, respectively.

15. The computer-implemented method of claim 12, further comprising:

identifying a run time parameter in the process instance; and when the target definition is deployed on the execution application, receiving a value for the run time parameter.

16. The computer-implemented method of claim 12, further comprising:

receiving a request to run the process on a different target having a different platform;

retrieving the process instance;

reading the plurality of activity instances included in the process instance to identify respective different blocks of executable code associated with the different platform;

combining the parameter values in the process instance and the identified blocks of different executable code in the activities to create a different target definition; and providing the different target definition to the execution application for execution on the different target.

17. The computer-implemented method of claim 12, where the executable code comprises code interpretable by a Unix platform or a Windows platform.

* * * * *

UNITED STATES PATENT AND TRADEMARK OFFICE
CERTIFICATE OF CORRECTION

PATENT NO. : 9,965,260 B2
APPLICATION NO. : 14/624878
DATED : May 8, 2018
INVENTOR(S) : Agrawal et al.

Page 1 of 1

It is certified that error appears in the above-identified patent and that said Letters Patent is hereby corrected as shown below:

In the Claims

In Column 12, Line 43, in Claim 10, delete "fun" and insert -- run --, therefor.

Signed and Sealed this
Sixth Day of November, 2018

Andrei Iancu
*Director of the United States Patent and Trademark Office*